United States Patent [19]

Martin et al.

[11] Patent Number: 4,801,006

[45] Date of Patent: * Jan. 31, 1989

[54] PREPACKED AND DISPOSABLE ANIMAL LITTER RECEPTACLES AND CONTAINMENT THEREFOR

[76] Inventors: James L. Martin, Poplar & McKinley, Stonefort, Ill. 62987; A. R. Jackson, 707 S. Bentley, Marion, Ill. 62959

[*] Notice: The portion of the term of this patent subsequent to Feb. 16, 2005 has been disclaimed.

[21] Appl. No.: 154,774

[22] Filed: Feb. 10, 1988

Related U.S. Application Data

[63] Continuation-in-part of Ser. No. 057,600, Jun. 3, 1987, Pat. No. 4,724,955, which is a continuation-in-part of Ser. No. 864,152, May 16, 1986, abandoned.

[51] Int. Cl.$^4$ .................. A01K 1/00; B65D 21/00
[52] U.S. Cl. ......................... 206/204; 119/1; 206/223; 206/499; 229/155
[58] Field of Search ............ 119/1; 206/204, 206, 206/223, 499; 220/404; 229/101, 125, 126, 155, 158

[56] References Cited

U.S. PATENT DOCUMENTS

| | | | |
|---|---|---|---|
| 2,382,891 | 8/1945 | McCormick | 229/101 |
| 2,582,502 | 1/1952 | Nagler | 24/261 |
| 2,783,933 | 3/1957 | Sharts | 229/37 |
| 2,962,202 | 11/1960 | Hansen | 229/132 |
| 3,024,961 | 3/1962 | Galloway | 229/155 |
| 3,037,681 | 6/1962 | Kuchenbecher et al. | 229/158 |
| 3,182,888 | 5/1965 | Chidsey, Jr. et al. | 229/158 |
| 3,227,137 | 1/1966 | Goldman et al. | 119/1 |
| 3,377,990 | 4/1968 | Mitchell | 119/1 |
| 3,416,995 | 12/1968 | Wilson | 119/1 |
| 3,443,971 | 5/1969 | Wood | 220/404 |
| 3,676,887 | 7/1972 | Klein | 15/104.8 |
| 3,684,155 | 8/1972 | Smith | 119/1 |
| 3,886,901 | 6/1975 | Zeitter | 119/1 |
| 4,013,213 | 3/1977 | Geibel | 229/158 |
| 4,053,099 | 10/1977 | Lock | 229/155 |
| 4,164,314 | 8/1979 | Edgar | 229/125 |
| 4,260,100 | 4/1981 | Hoffman | 229/155 |
| 4,279,217 | 7/1981 | Behringer | 119/1 |
| 4,312,295 | 1/1982 | Harrington | 119/1 |
| 4,328,923 | 5/1982 | Graser | 229/101 |
| 4,548,160 | 10/1985 | Feitelson | 119/1 |
| 4,553,671 | 11/1985 | Cheesman | 206/611 |
| 4,615,300 | 10/1986 | McDonough | 119/1 |

FOREIGN PATENT DOCUMENTS

| | | | |
|---|---|---|---|
| 778492 | 3/1935 | France | 229/155 |
| 115208 | 10/1945 | Sweden | 229/155 |
| 00504 | 3/1981 | World Int. Prop. O. | |

*Primary Examiner*—Jimmy G. Foster
*Attorney, Agent, or Firm*—J. Gibson Semmes

[57] ABSTRACT

A prepacked disposable animal litter and waste container in which one or more membranous bags are filled with an absorbent litter, each bag being contained within a substantially rigid fiberboard carton container, wherein said bags may be each successively exposed for utility. In use, the flaps of the container are opened and bent on fold lines such that the flaps are compressed against the sides of the container. Thereafter, the top wall of a bag is pulled tautly over the outside of the compressed flaps, thereby protecting both the interior and the exterior of the container from soiling. Together with the flaps of the container, the bags form a repository for urine and fecal matter. After the uppermost exposed bag is used, said bag becomes a disposal means for the contaminated litter and the user may discard the bags. Flaps of the container may extend the container sides vertically. Adhesive means secures the flaps, and one overlying bag top is adjusted and placed temporarily as required, in the use mode. In a further embodiment of the invention, locking top flaps are provided.

5 Claims, 5 Drawing Sheets

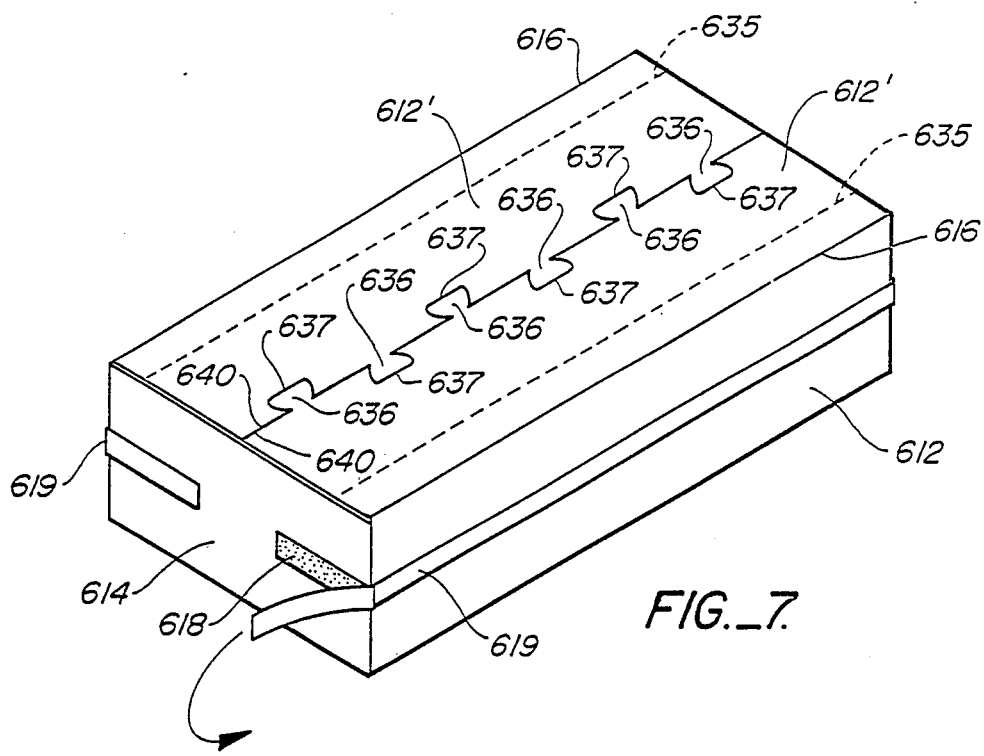
FIG._7.
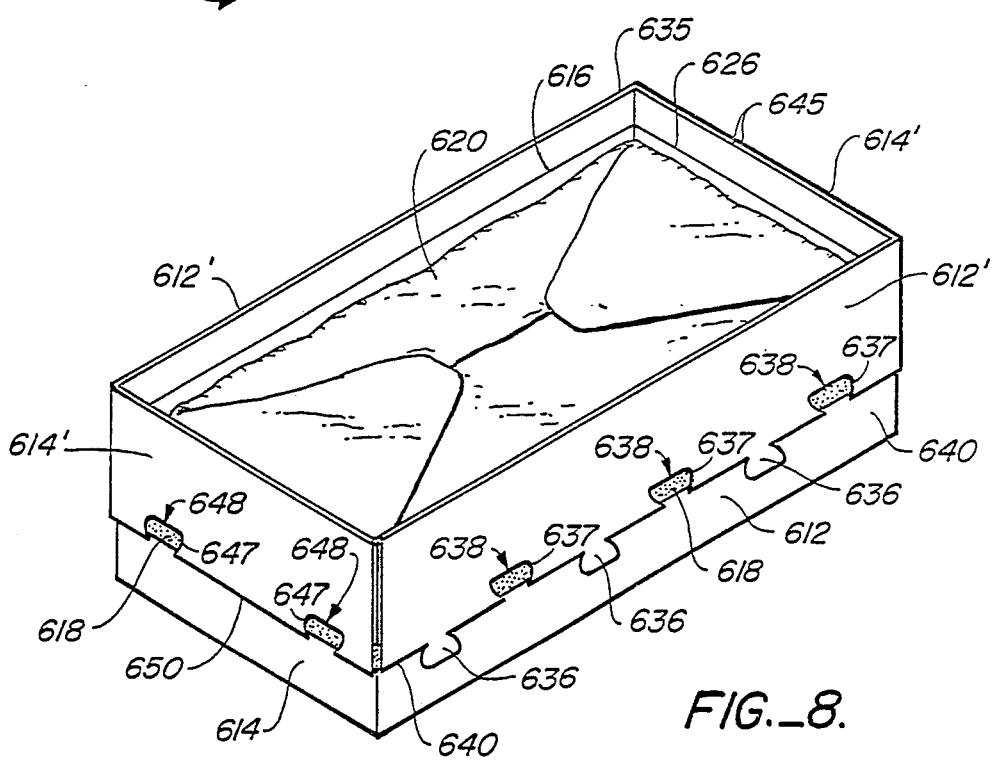
FIG._8.

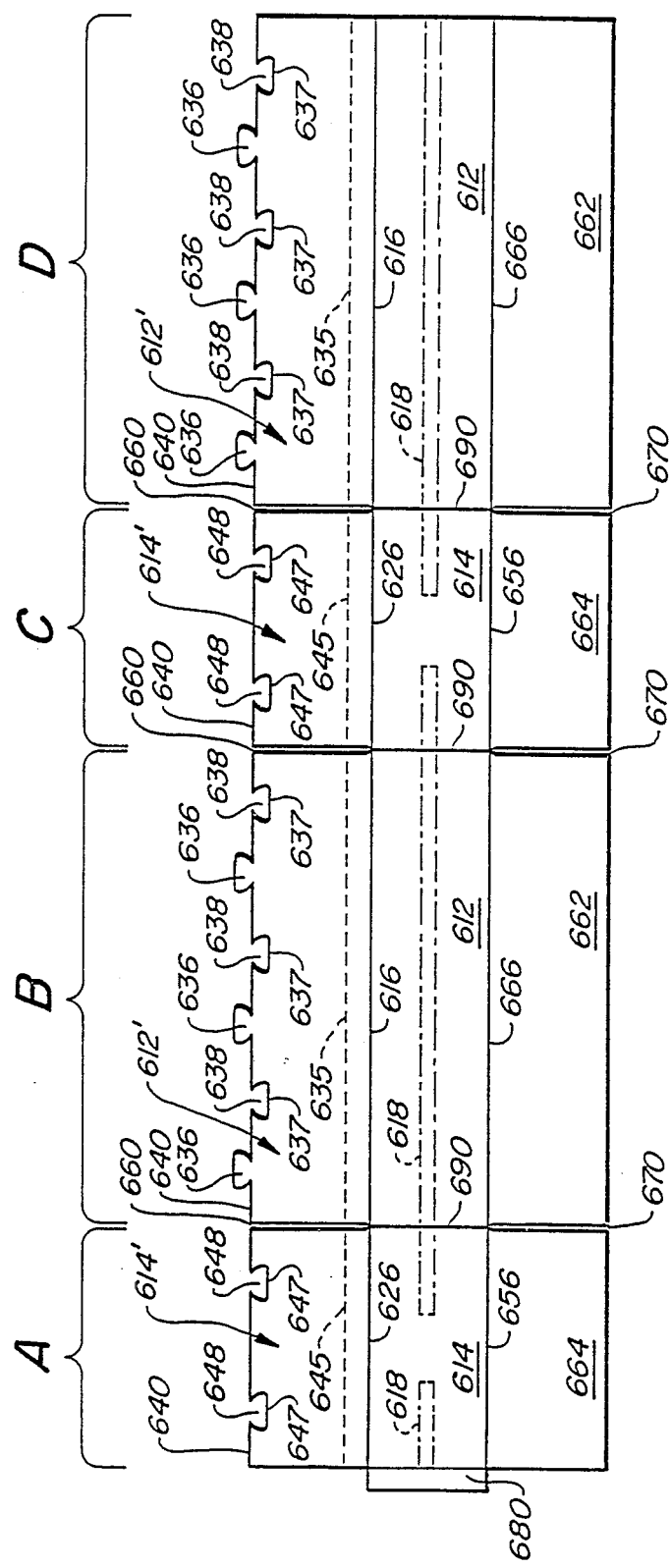
FIG._9.

PREPACKED AND DISPOSABLE ANIMAL LITTER RECEPTACLES AND CONTAINMENT THEREFOR

CROSS REFERENCES TO RELATED APPLICATIONS

This is a continuation-in-part of pending Ser. No. 07/57,600, filed June 3, 1987, U.S. Pat. No. 4,724,955, itself a continuation-in-part of Ser. No. 06/864,152, filed May 16, 1986, now abandoned. Both prior applications are incorporated herein by reference thereto.

BACKGROUND OF THE INVENTION

1. Field of the Invention

Whereas the invention is defined in terms of disposable animal litter utility and containment, the scope of invention is such as to encompass its utility with respect to variable absorbent comminute substances, irrespective of the species of animal defecating and/or urinating therein. Conceivably, the prepacked receptacle unit may be employed in any number of configurations which may be suitably adapted for in-place use at preformed confined spaces such as cages and the like. For purposes of illustration only, the receptacle container is represented in rectangular box-like configuration, as this is generally considered the most convenient three-dimensional form for stacking, storage, transport and the like.

2. Description of The Prior Art

The most cogent developments are set forth in U.S. Patents:

Feeley, U.S. Pat. No. 3,715,218, Feb. 6, 1973
Maier, et al., U.S. Pat. No. 4,007,285, Feb. 8, 1977
Bush, U.S. Pat. No. 4,069,348, Jan. 17, 1978
Robinson, U.S. Pat. No. 4,318,475, Mar. 9, 1982
Cornelissens, et al., U.S. Pat. No. 4,397,391, Aug. 9, 1983
Murphy, et al., U.S. Pat. No. 4,517,206, May 14, 1985

The prior art is also represented by other dispensing cartons or plastic containers as referenced by the patents to E. E. Heck, U.S. Pat. No. 3,451,453, dated June 24, 1969 and Christie, U.S. Pat. No. 4,363,405, dated Dec. 14, 1982. Related packaging art is represented by Herrington, U.S. Pat. No. 4,512,476, dated Apr. 23, 1985. Within the art, no provision has been made for containment of measured quantities of a litter absorbent substance confined within stacked, disposable bags thus providing multiple, separate layers of absorbent comminute material, comprising a package which when opened, exposes the contents of each successive bag for utility which is readily disposable, immediately and sequentially thereafter. A fiberboard container serves as a temporary housing for the litter bags and contents, precedent to disposal and during utility the combination of fiberboard container and exposed litter bag are coactively engaged to form a substantially rigid, open cavity, the exterior of which is temporarily protected by an impermeable membrane.

SUMMARY OF THE INVENTION

This is a disposable animal litter box which contains multiple layers of contained litter absorbent, wherein two or more successive, partially filled bags are set within a cardboard box in superposed arrangement, so that as one bag may be used in place and subsequently discarded, its removal uncovers a succeeding disposable bag having another measure of the animal litter absorbent within. One of the desirable features of the invention resides in its sanitary utility and convenient hands-off disposability, as required. The containment box is protected against exterior contamination by the interior of each successive receptacle, utility bag as it is opened and secured for use. Clearly, the box which gives form to the partially filled bags, may be used over and over again, but its primary function is as plural bag container and shipping element.

To summarize, the invention combines numerous advantages: Each layer of litter is contained in its own impermeable bag; when the bag is opened and deployed in use, by securing it to the outside periphery of the containment box, not only is the interior of the box protected, but the exterior as well; when the litter in said bag is soiled, the bag becomes a disposal bag as well, In a further embodiment of this invention, locking top flaps are provided which also advantageously substantially eliminate the need to punch out apertures in said flaps in order to access the adhesive strip on the external periphery of the box.

BRIEF DESCRIPTION OF THE DRAWINGS

FIG. 7 is yet another embodiment of the invention depicted in FIG. 1, a perspective view showing a closed box.

FIG. 8 is another perspective view of the box of FIG. 7 in which the box is opened.

FIG. 9 is an exploded view of the blank which is folded to construct the box depicted in FIGS. 7 and 8; the adhesive means thereof is depicted in phantom.

DESCRIPTION OF THE PREFERRED EMBODIMENTS

Figure 1:
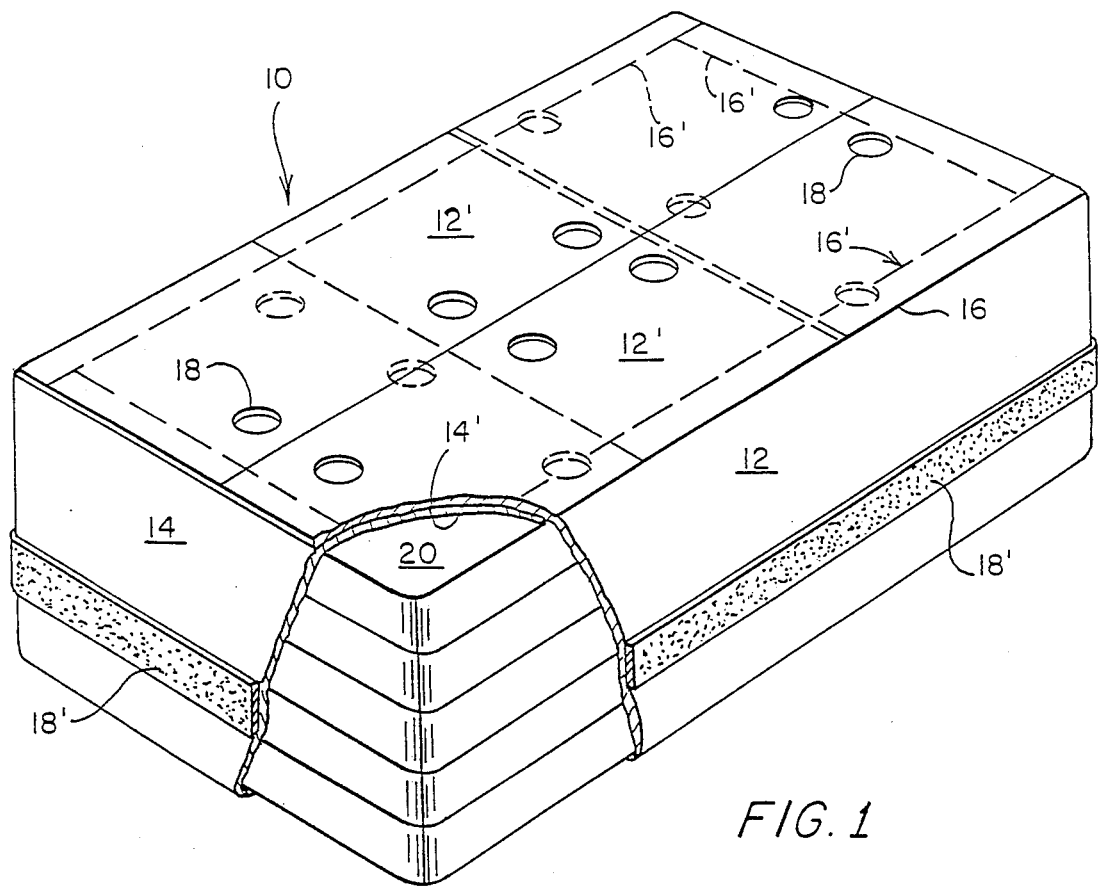
FIG. 1 is a view in perspective of the invention, a portion thereof being broken away, the invention appearing in its storage display and shipping capacity.

Referring to FIG. 1, the disposable rigid carton 10 may be formed in rectangular configuration, having side walls 12 with flaps 12', and end walls 14 with flaps 14'. The flaps 12' and 14' are each provided with longitudinal serrations 16' at the connecting end thereof, thus providing with the serrations 16 upstanding elongations to vertically extend the side and end walls of the box, upon opening thereof in the utility mode, see FIGS. 2 and 4. Note that all flaps 12' and 14' define cut-out apertures 18 adjacent their free ends, thus providing access to the double-sided adhesive strip 18' which extends transversely about the walls of the box. A removable protective tape, not shown, is superposed upon the adhesive during display and/or shipping. Its removal before use of the receptacles is essential. The placement of adhesive behind the cut-out apertures allows the bag top to be pulled down around the box's exterior and adjusted without premature attachment to the exposed adhesive occuring. When the bag is in place one presses on the bag directly over the cut-outs, thus it may be secured, resulting in the placement of a complete protective bag membrane for the exterior of the box.

Figure 3:
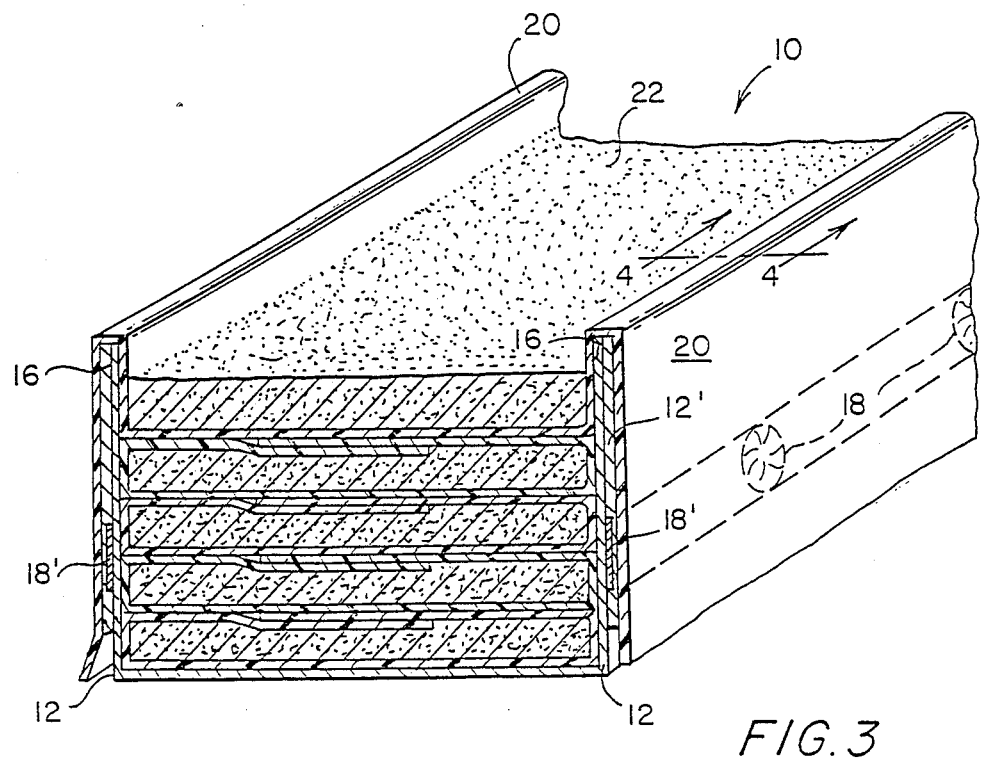
FIG. 3 is a section view in partial perspective, showing the flaps of the FIG. 2 box folded into contiguous sealed relationship with sides of the box, the exposed bag being held in position. The forward portion is a section view taken along lines 3—3 of FIG. 2.
Figure 2:
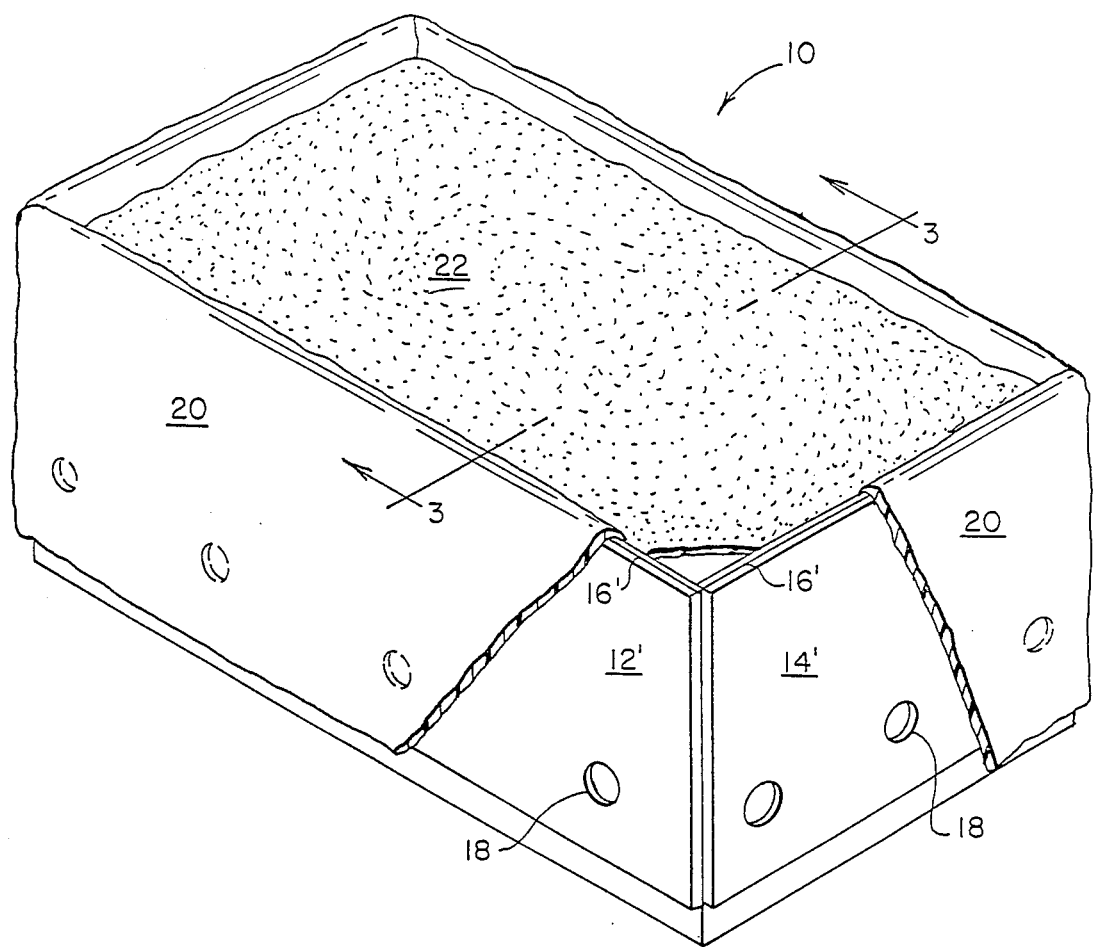
FIG. 2 is a view in perspective of the invention receptacle carton as it is opened for usage, a near corner thereof being broken away to expose the folded open flaps, relative to an exposed receptacle bag.

FIG. 2 illustrates the flap 12'-14' in their fully opened state and FIG. 3 illustrates the same in fully opened and adhesively set position. FIG. 3, then, depicts the operative or utility mode wherein an exposed topmost litter bag 20 is set so that the free end of the bag is adhesively held downward against the gravity and weight of the closed and partially filled end of the bag, holding the open end of the bag down as a membrane against exposed flap portions 12 and 14 of the containment box. The litter box top excess depends below the flaps, whereby the holding action of the adhesive and the elastic tendency of the flaps to return to their flat position in packaging is restrained, resulting in a complete protective bag membrane for the exposed flap portions of the carton and the containment carton itself. Removal of the bag and its contaminated contents is easily undertaken by stripping the bag from the adhesive hold, and lifting the exposed bag and its contents from the box.

Figure 4:
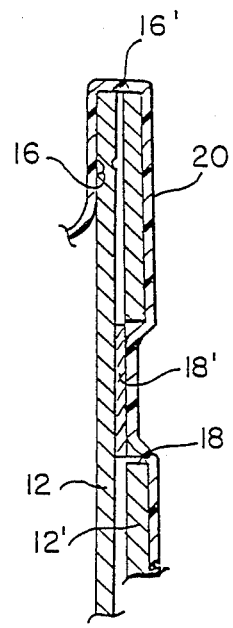
FIG. 4 is an enlarged section view of FIG. 3, taken along lines 4—4 thereof.

FIG. 4 is a section view of the FIG. 3 assembly showing the utility mode, the same being taken along the lines 4—4 of FIG. 3.

In the multi-layered bag arrangement of FIGS. 1 and 3, the respective bags 20 which are not exposed for utility are appropriately folded and closed above the contained litter, beneath the topmost bag until such time as the topmost bag has been used as a receptacle and removed, thus exposing successively each of the other bags for sequential utility, as required. As shown in FIG. 3, the lowermost layers of stacked bags 20, together with the topmost, comprise plural inserts for the bag-dispensing container box 10 itself. A horizontal cross-section of each bag and content, reference FIG. 3, would reveal that its configuration conforms in outline to the horizontal cross-section of the container 10. Thus, bags 20, in this instance are preferably of rectangular cross-section configuration, also in essentially the same size and horizontal cross-section of the container, per se. Thus, as container 10 is of rectangular cross-section horizontally, so then the bag would be of similar horizontal cross-section and of equivalent surface area in cross-section. The depth of litter in each bag is a matter of choice in manufacture and/or market demand. Two or more bags are in disposed superposition, preferably. If the container 10 were of circular, ovular or triangular horizontal cross-section, then the bag size would, perforce be of equivalent horizontal cross- section, with a variable depth characteristic.

These characteristics in configuration will be noted from FIGS. 3 and 4, wherein the free end top of the uppermost, exposed bag 20 is folded over the flaps, whereby the adhesive 18' is exposed through the flap apertures 18 to engage and retain the bag top against the respective flaps, the flaps being secured to the carton by the same adhesive 18'. The box is thus substantially encased with a protective outside membrane. Thereafter, the bag is made ready for removal and disposal with its soiled litter waste.

Figure 5:
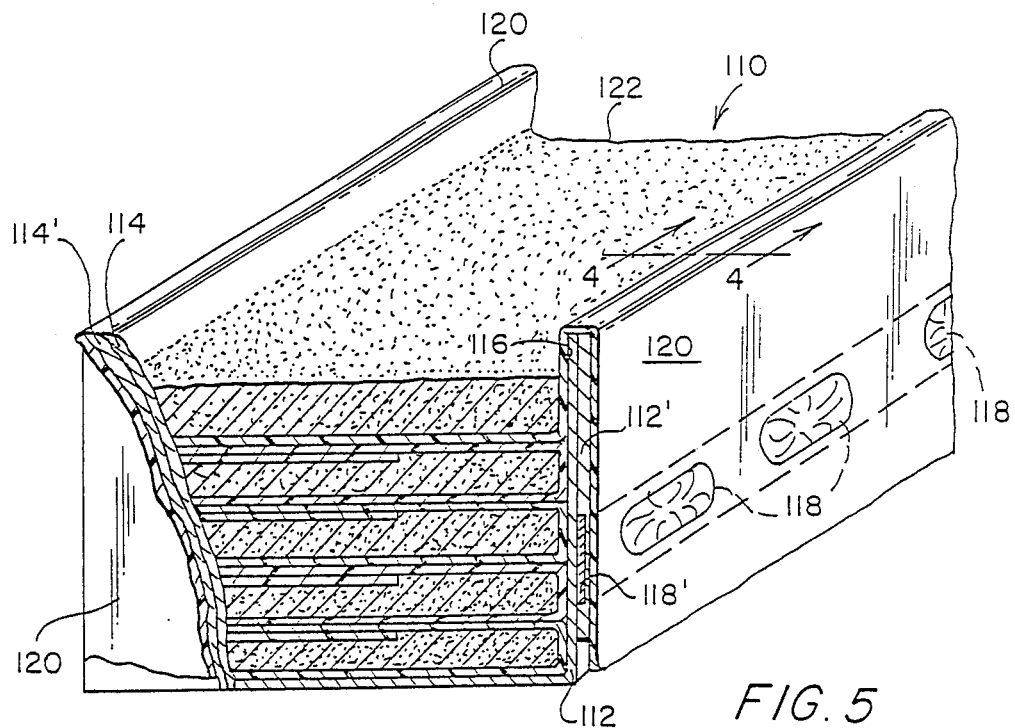
FIG. 5 is a section view in partial perspective, showing an alternate embodiment of the invention depicted in FIG. 3; a near corner thereof in partial section to disclose the relationship of the overlaid bag, the end flap and the end wall.

In FIG. 5 is depicted a further embodiment of invention, specifically with reference to the flap apertures 118. In FIG. 5, the elements are numbered as in FIG. 3 except that the reference numbers are preceded with "1". Thus the free end top of the uppermost, exposed bag 120 is folded over the flaps 112' and 114', whereby the adhesive 118' is exposed through the flap apertures 118 to engage and retain said bag top against the respective flaps. However, the plurality of apertures 118 are horizontally elongated, resulting in a cylindrical configuration (although other elongate configurations are well within the scope of this invention, e.g., rectangular apertures). These elongated access apertures are especially advantageous to the consumer. In common practice, the consumer will locate the carton in an area convenient to the animal, e.g., on the floor or ground. In so doing, the apertures 118 are below the sight level and the user must bend over or stoop to draw the bag 120 over the flaps in the use mode. Thus, in drawing the bag top 120 onto the flaps 112' and 114', the consumer occasionally may experience difficulty in locating the apertures to press and adhere the bag against the pressure-sensitive adhesive 118'. The elongate apertures 118 offer an increased surface area with which to contact the bag top 120 against the adhesive 118'. Especially advantageous though, is the fact that the elongate apertures 118 allow the user to easily locate tactilely the adhesive 118' by running the fingers laterally along the flaps 112' and 114' when the bag top is drawn over said flaps, and thereby to engage the bag top 120 against said adhesive by simply pressing inwardly.

Figure 6:
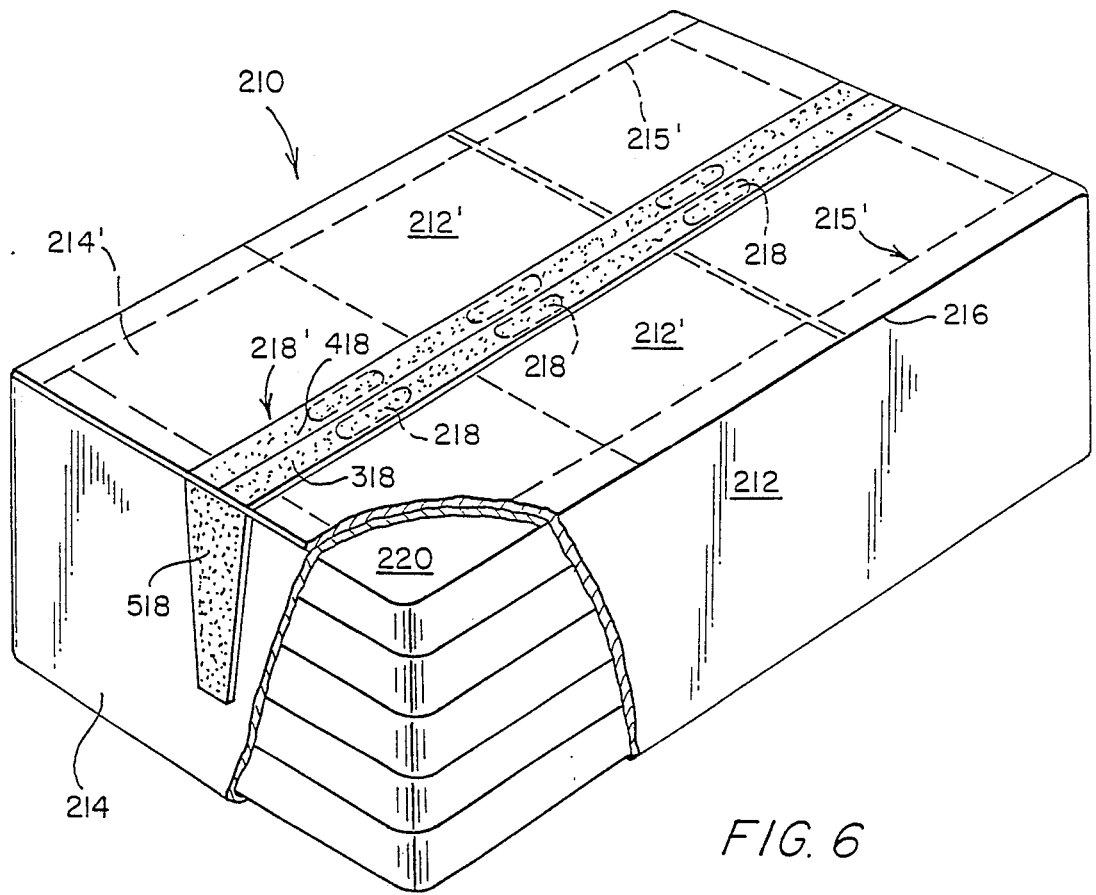
FIG. 6 is a further embodiment of the invention depicted in FIG. 1, a partial perspective view in which the closed box is shown partially in section.

FIG. 6 depicts yet another alternate embodiment of the invention. In this partial perspective view, litter box 210 is depicted in its closed, shipping and storage mode. Unlike the view of the invention in FIG. 1, wherein the adhesive means 18 was disclosed on the periphery of box as a continuous swatch on side walls 12, 12 and end walls 14, 14, the adhesive is now depicted generally as 218', comprising top portions 318 and 418, and two side portions 518 (a substantially identical side portion on the opposed end wall 214 is not shown). The flaps 212' and 214' are each provided with longitudinal serrations 216' at the connecting end thereof, thus providing with the serrations 216 upstanding elongations to vertically extend the side and end walls of the box, upon opening thereof in the utility mode. Flaps 212' each have three apertures 218 disposed therein (although more or less are also within the scope of this invention). End flap 214' also has a single, centered, elongated aperture (not shown). In FIG. 6, the adhesive 218' can generally be applied as a single strip of double-sided tape, with a backing or cover strip (not shown). Portion 518 has a tapered or triangular configuration, although another configuration is suitable. Portions 318 and 418 are shown as separate components although, in fact, they could be applied in a single application with a tape gun with the tape being (but not the backing) medially slit. In this embodiment, adhesive means 218' and its backing can be used to seal the box during shipment and storage, as well as to hold down the flaps and liner during the use mode. The apertures 218, are deployed on the distal portions of flaps 212' directly below the adhesive 218'. When flaps 212', are pressed against side walls 212 in the use mode, the adhesive 218' is available for use directly behind apertures 218. Also, although not shown, a single, centered aperture is cut out of the distal end of flap 214', such that the side portion of liner 220 can attach through said aperture onto adhesive means 518 (the same deployment occurs with the opposite side, not shown). Also, in order to help in putting the litter containment box into use, the unshown backing or cover strip can have a free or unadhered portion in the form of a tab at the lower portion of adhesive means 518 which would enable the user to pull or remove such cover strip easily.

FIGS. 7–9 disclose yet another embodiment of the invention. In this version of the invention, the top panels or flaps 612', 612' are provided with a plurality of protrusions and indentations, while lateral top panels or flaps 614', 614' are provided with one or more indentations. These series of protrusions and indentations in flaps 612', 612' provide a locking means when the flaps are first closed or reclosed after completion of use. However, a second advantage is apparent upon use of the litter box. Namely, the indentations in each flap provide an alternative to the apertures of the previous embodiment for accessing the adhesive. All flaps 612', 612', 614', 614' obtain this advantage. As will be seen, the construction of the flaps in this manner is exceedingly beneficial.

In FIG. 7, each top flap 612' has a leading edge 640. Each leading edge has been diecut, or otherwise formed, into a series of elliptical (although such shape is not limiting to the invention) protrusions or tabs 636, and corresponding indentations or recesses 637. The leading edge of the diecut righthand top flap should be complementary to the leading edge of the diecut lefthand top flap, resulting in a series of mating protrusions and indentations.

Although not limiting to the invention, serrations 616, 616, forming fold lines for the top flaps 612', 612', and fold lines 635, 635, allow the flaps 612', 612', when in use, to form a raised lip, as best shown in FIG. 8, so that the domestic animal has a vertically raised containment area and there is less likelihood of litter and detritus being scattered by the animal's movements (i.e., such as burying its wastes after voiding or defecating).

In use, the flaps 612', 612' are folded against sides 612, 612, where they meet adhesive strips 618, 618 (Note, again, the non-limiting use of two adhesive strips 618, 618, which have been covered with cover strips 619, 619, although a single adhesive strip could also be implemented). Similarly, lateral flaps 614', 614' are folded against sides 614, 614, accessing the extended portions of adhesive means 618, 618.

Flaps 614', 614' are each similarly provided with serration line 626 and fold line 645 to provide side heights equal in height to the flaps 612', 612' (as desired; lesser or greater heights are also within the invention). Opening flaps 612', 612', 614', 614', exposes plural bags 620.

In greater detail, in FIG. 9, the expanded blank forming the litter boxes of the invention depicts flaps 614', 612', 614', 612', joined by serrations 626, 626, 616, 616, to side panels 614, 614, 612, 612, which are correspondingly joined by serrations 666, 666, 656, 656, to bottom panels 664, 664, 662, 662. Score lines 660, 660, 660 are formed between flaps 614', 612', 614', 612'. Score lines 670, 670, 670 are formed between bottom panels 664, 662, 664, 662. In constructing the blank into the disposable litter box, portion D is swung inwardly on fold line 690, and bottom panel 662 is tucked under bottom panel 664. Corresponding portion B is similarly swung on fold line 690 and its panel 662 is swung under panel 664.

Finally, portion A is swung on fold line 690 such that its panel 664 is positioned above joined panels 662, 662. The assembled box is completed by gluing down glue flap 680 against panel 612 of portion D. It should be apparent that any adhesive or securing means can be used to secure the panels of the blank together and, moreover, the particular configuration of the blank depicted in FIG. 9 is not limiting.

It should be apparent that the embodiment depicted in FIGS. 7–9 provide potential manufacturing and use advantages. Unlike the previous embodiments, the apertures (such as 18 in FIG. 1) are not necessary since the apertures 638, 638, 648, 648 formed by indentations 637, 637, 647, 647, take the place thereof. However, as in the previous embodiments, it is preferred that the thus formed apertures 638, 638, 648, 648 be laterally elongated so as to allow easy tactile alignment of the bag 620 with the adhesive.

The provision of the indentations eliminates the need to punch or cut out in the container such apertures, reducing a manufacturing step and obviating the need to dispose of waste scrap cardboard or other box material. Secondly, the top flaps can easily be stamped out on a die or other means of mechanized manufacture. Thirdly, the complementary protrusions and indentations in each top flap implement a locking flap means which may reduce the need for strong adhesive means to secure the top, closing flaps. Additionally, such interlocking means may augment the use of higher grade cartonboard or other box material such that high quality graphics and other advertising or identifying materials may be used which are not obscured by any adhesive means, such as shipping tape, which ordinarily might be needed to secure the top flaps from unintentionally opening.

Whereas it may not be apparent from reference to the drawings, the comminutes or absorbent granules 22 comprise heavy, porous sand-like grains such as are commonly used for cat litter. Other litter materials such as comminuted clay, fossilized plant, and the like are suitable for use, with materials having good absorbency and low dusting properties being most preferred for use. In addition to their normal function of waste containment, they serve to anchor the bags against displacement in the carton, especially when exposed and the free and open end of the uppermost bag is drawn taut, folded over the flaps and held down against the flaps by the adhesive 18'. The adhesive material, as previously discussed is preferably double-sided tape. This can be selected from materials known to those skilled in the art, e.g., pressure-sensitive adhesives applied to films or other appropriate thin, paper or fabric substrates. (See, Handbook of Pressure-Sensitive Adhesives (Ed. D. Satas) (Van Nostrand, N.Y., 1982), esp. pp. 11–12 thereof, the disclosure of which is incorporated in its entirety by reference herein.) As previously discussed, the adhesive is covered with a removable backing or protective tape, which is releasable from the adhesive, for storage and shipping purposes. Also the container carton may consist of any suitable disposable substance such as fiberboard, wood, rigid plastic, etc. and the bag so long as it is fluid impermeable may comprise variant flexible materials which are sufficiently cohesive to support the load of litter and absorbed waste. Various other means of temporarily securing the folded flaps to the carton container box and the exposed bag to the flap may be employed without departing from the invention as shown and described; reference FIGS. 3 and 4.

We claim:
1. A disposable bag dispensing container for animal litter and waste comprising in combination:
 (A) disposable, substantially rigid carton having top, bottom and at least two intermediate sides and at least two compressible flaps in extension of said sides, said flaps being depressible disposed with respect to the side when in use, but said flaps being closeable by a mating locking means provided in said flaps;
 (B) adhesive means on said sides of the carton whereby to secure the flaps and a flexible bag relative to the side;
 (C) one or more flexible bags each in superposed array with respect to the other, said bags each containing a measure of comminute litter absorbent substance in at least sufficient quantity to cover an area equivalent to a horizontal cross-section of the carton; the free end of each said bag being openable and successively engageable and disengageable with the flaps and the side of the carton.

2. The container of claim 1 wherein said mating locking means comprises at least two engaging flaps, in which the leading edge of the first of said flaps is provided with a plurality of protrusions and indentations, and the second of said flaps is provided with a complementary plurality of protrusions and indentations.

3. The container of claim 2 wherein said indentations form at least one aperture in one of said flaps so as to provide the free end of a bag access to said adhesive means of (B) when the flap is compressed to the side of said carton.

4. The container of claim 3 wherein said aperture is laterally elongated.

5. The container of claim 1 wherein at least one of said flaps is provided with at least one longitudinal serration which forms a vertically raised portion of said flap when the flap is compressed to the side of said carton.

* * * * *